(12) United States Patent
Gurnasinghani et al.

(10) Patent No.: US 12,326,802 B2
(45) Date of Patent: *Jun. 10, 2025

(54) DEVELOPMENT TEST AUTOMATION FRAMEWORK

(71) Applicant: Bank of America Corporation, Charlotte, NC (US)

(72) Inventors: Charanjit Singh Gurnasinghani, West Hills, CA (US); Nadeem Panjwani, Carrollton, TX (US); Kurt R. Schultz, Newbury Park, CA (US)

(73) Assignee: Bank of America Corporation, Charlotte, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/433,574

(22) Filed: Feb. 6, 2024

(65) Prior Publication Data

US 2024/0176731 A1 May 30, 2024

Related U.S. Application Data

(63) Continuation of application No. 17/868,912, filed on Jul. 20, 2022, now Pat. No. 11,966,326.

(51) Int. Cl.
*G06F 11/3668* (2025.01)
*G06F 11/36* (2025.01)
*G06N 5/022* (2023.01)

(52) U.S. Cl.
CPC .......... *G06F 11/3692* (2013.01); *G06F 11/36* (2013.01); *G06F 11/3688* (2013.01); *G06N 5/022* (2013.01)

(58) Field of Classification Search
CPC .. G06F 11/36; G06F 11/3688; G06F 11/3692; G06N 5/022
See application file for complete search history.

(56) References Cited

U.S. PATENT DOCUMENTS

| | | | |
|---|---|---|---|
| 10,007,595 B2 | 6/2018 | Junker et al. | |
| 10,176,087 B1 * | 1/2019 | Thomas | G06F 11/3684 |
| 10,318,412 B1 | 6/2019 | McKearney, Jr. et al. | |

(Continued)

OTHER PUBLICATIONS

Dec. 21, 2023—{(US) Notice of Allowance—U.S. Appl. No. 17/868,912.

*Primary Examiner* — Douglas M Slachta
(74) *Attorney, Agent, or Firm* — Banner & Witcoff, Ltd.

(57) ABSTRACT

Aspects of the disclosure relate to automatically detecting, analyzing, and correcting errors in an application. The computing platform may identify errors in an application, and subsequently correct the errors based on corresponding actions that have been determined to correct the errors. The computing platform may determine a confidence score that corresponds to a particular action, representing the level of confidence that the particular action will successfully correct the corresponding error. The computing platform may set a predetermined threshold range that is compared to the confidence score, in which a confidence score greater than the threshold range will cause the computing platform to automatically correct the error. The computing platform may input results and feedback into a machine learning model to further refine the accuracy and reliability of the computing platform over time.

20 Claims, 14 Drawing Sheets

(56) References Cited

U.S. PATENT DOCUMENTS

| | | |
|---|---|---|
| 10,423,522 B2 | 9/2019 | Bergen |
| 10,540,272 B2 | 1/2020 | Ellis et al. |
| 10,585,780 B2 * | 3/2020 | Woulfe .................. G06F 8/33 |
| 10,677,038 B2 | 6/2020 | Venkatasubbarao et al. |
| 10,684,943 B2 | 6/2020 | Fei et al. |
| 10,739,411 B2 | 8/2020 | Bhat et al. |
| 10,740,221 B2 | 8/2020 | Saxena et al. |
| 10,783,065 B2 | 9/2020 | Allen et al. |
| 10,789,156 B2 | 9/2020 | Koplovich et al. |
| 10,816,564 B2 | 10/2020 | Sasaki et al. |
| 10,963,372 B1 | 3/2021 | Jena et al. |
| 10,983,904 B1 | 4/2021 | Sundararaman et al. |
| 11,003,568 B2 * | 5/2021 | Smith ................. G06F 11/0793 |
| 11,061,044 B2 | 7/2021 | Yamagata et al. |
| 11,126,543 B2 | 9/2021 | Ellis et al. |
| 11,263,117 B2 | 3/2022 | Mamadapur et al. |
| 11,263,119 B2 | 3/2022 | Wareham et al. |
| 11,301,366 B2 | 4/2022 | Gupta |
| 11,314,627 B2 | 4/2022 | Subramanian et al. |
| 11,341,030 B2 | 5/2022 | Christen |
| 11,360,110 B2 | 6/2022 | Yamaguchi et al. |
| 11,366,747 B2 | 6/2022 | Allen et al. |
| 11,372,751 B2 | 6/2022 | Jena et al. |
| 11,397,629 B1 | 7/2022 | Koneru |
| 11,580,009 B2 * | 2/2023 | Plawecki ............ G06F 11/3664 |
| 11,966,326 B2 * | 4/2024 | Gurnasinghani ... G06F 11/3688 |
| 2014/0013298 A1 * | 1/2014 | Gyure ................ G06F 11/3684 717/106 |
| 2018/0357511 A1 * | 12/2018 | Misra .................... G06N 5/025 |
| 2019/0171633 A1 | 6/2019 | Demla et al. |
| 2019/0266070 A1 * | 8/2019 | Bhandarkar ........ G06F 11/3072 |
| 2019/0377666 A1 | 12/2019 | Klein |
| 2020/0110693 A1 | 4/2020 | Herrin et al. |
| 2020/0372204 A1 * | 11/2020 | Bradley ................ G06F 40/186 |
| 2021/0056007 A1 * | 2/2021 | Viswanathan ...... G06F 11/3688 |
| 2021/0133670 A1 * | 5/2021 | Cella ..................... G06N 3/044 |
| 2021/0182031 A1 * | 6/2021 | Ye .............................. G06F 8/34 |
| 2021/0264305 A1 * | 8/2021 | Bhamidipati ........... G06F 18/22 |
| 2021/0350251 A1 * | 11/2021 | Lewis .................... G06N 20/00 |
| 2021/0390011 A1 * | 12/2021 | Cser .................... G06F 11/3688 |
| 2022/0012168 A1 * | 1/2022 | Challa ................. G06F 11/3688 |
| 2023/0195558 A1 * | 6/2023 | Purushothaman ..... G06N 20/20 714/15 |
| 2023/0376296 A1 * | 11/2023 | Nomula .................... G06F 8/71 |

* cited by examiner

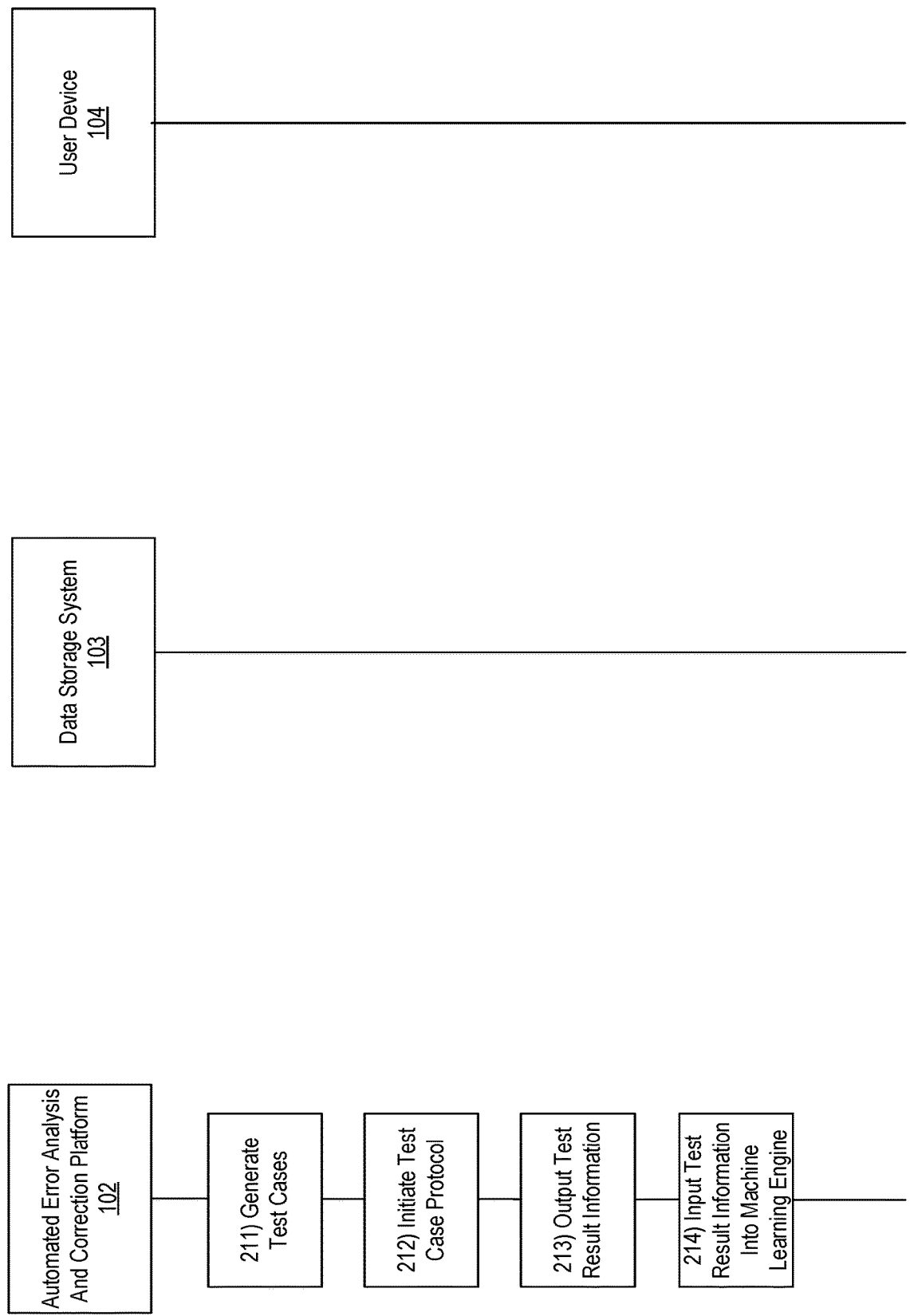

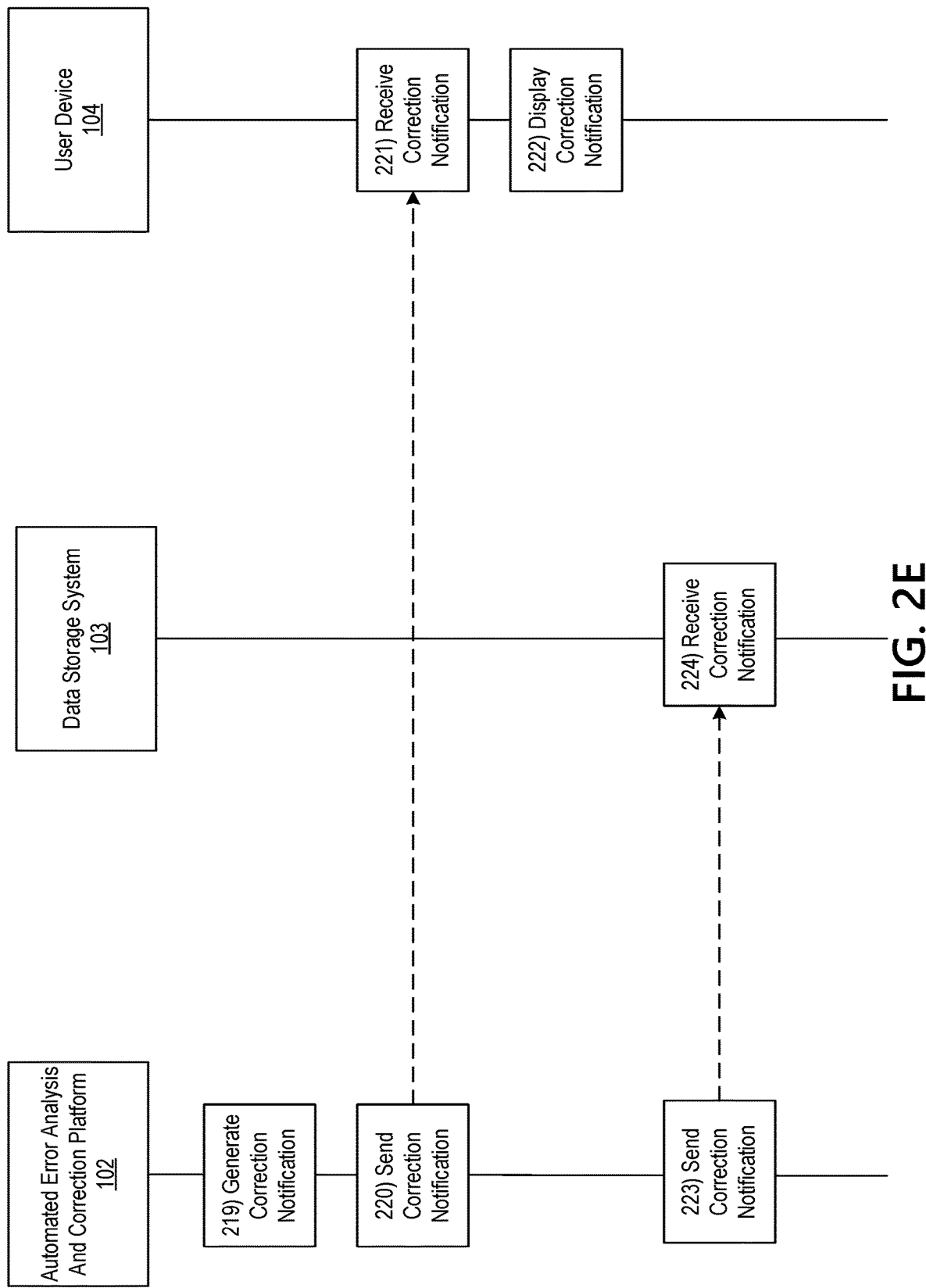

405

Results of Test Case Protocol

Test Cases: 121

Passes: 114

Errors: 7

Error Remediation Information And Corresponding Confidence Score

An error has been detected:

"Error #1"

An action to correct the error has been proposed:

"Action #1"

Confidence Score: 95%

Correction Notification

An action to correct an error has been made:

"Action #1" - 95% Confidence Score

Recommendation Notification

An action to correct an error is recommended:

"Action #1" - 85% Confidence Score

Storage Notification

An action to correct an error has been made with low confidence:

"Action #1" - 55% Confidence Score

FIG. 6C

DEVELOPMENT TEST AUTOMATION FRAMEWORK

CROSS-REFERENCE TO RELATED APPLICATIONS

The present application is a continuation of co-pending U.S. application Ser. No. 17/868,912 filed Jul. 20, 2022, entitled "Development Test Automation Framework" the contents of which are hereby incorporated by reference in its entirety.

BACKGROUND

Aspects of the disclosure relate to automatically detecting and correcting errors in a computer application. When a developer is developing an application, errors may be unknowingly introduced in the application. Errors may be detected and corrected during a quality control process. However, this process may be inefficient and time intensive, which may result in errors remaining undetected and uncorrected. Accordingly, it may be advantageous to identify more efficient and accurate methods for analyzing and correcting errors in a given application.

SUMMARY

Aspects of the disclosure provide effective, efficient, scalable, and convenient solutions that address and overcome the technical problems associated with error correction in an application or in application development. In accordance with one or more embodiments of the disclosure, a computing platform with at least one processor, a communication interface communicatively coupled to the at least one processor, and memory storing computer-readable instructions may train, based on historical error data, a machine learning engine, where training the machine learning engine configures the machine learning engine to identify, based on the historical error data, error remediation information, where the error remediation information may be an action to correct an identified error and a confidence score corresponding to the action. The computing platform may receive, from a user device, a request to identify and correct errors in an application. The computing platform may automatically identify a first error in the application by executing a plurality of test cases, specific to the application, where the plurality of test cases are stored at the computing platform using a plain language format. The computing platform may input the first error into the machine learning engine to output, for the first error, first error remediation information corresponding to the first error, where the first error remediation information comprises a first action to correct the first error and a first confidence score corresponding to the first action. The computing platform may compare the first confidence score to a first confidence threshold. Based on identifying that the first confidence threshold is exceeded, the computing platform may automatically correct the first error using the first action. The computing platform may send, once the first error has been corrected, one or more commands directing a data storage system to store an indication that the first error has been corrected, which may cause the data storage system to store the indication that the first error has been corrected.

In one or more instances, the computing platform may send a correction notification and one or more commands directing the user device to display the correction notification, which may cause the user device to display the correction notification. In one or more instances, the first confidence score may indicate a confidence that the first action will successfully correct the first error. In one or more instances, the plain language format may be Gherkin language syntax. In one or more instances, the computing platform may store, based on identifying that the first confidence threshold is not exceeded, the first error remediation information and the first confidence score at the data storage system.

In one or more examples, the computing platform may identify a second error in the application based on the executing the plurality of the test cases. The computing platform may input the second error into the machine learning engine to output, for the second error, second error remediation information corresponding to the second error, where the second error remediation comprises a second action to correct the second error and a second confidence score corresponding to the second action. The computing platform may compare the second confidence score to the first confidence threshold and a second confidence threshold that is lower than the first threshold.

In one or more instances, the computing platform may, based on determining that the second confidence score is lower than the first threshold and higher than the second threshold, generate a recommendation notification that recommends the second action to correct the second error, and indicates that the first error will not be automatically corrected based on the second confidence score.

In one or more examples, the computing platform may send the recommendation notification and one or more commands directing the data storage system to store the recommendation notification, which may cause the data storage system to store the recommendation notification. In one or more examples, the computing platform may send the recommendation notification and one or more commands directing the user device to display the recommendation notification, which may cause the user device to display the recommendation notification.

In one or more instances, the computing platform may identify a third error in the application based on executing the plurality of the test cases. The computing platform may input the third error into the machine learning engine to output, for the third error, third error remediation information corresponding to the third error, and the third error remediation may be a third action to correct the third error and a third confidence score corresponding to the third action. The computing platform may generate, based on determining that the third confidence score is lower than the first confidence threshold and lower than the second confidence threshold, a storage notification comprising the third error and the third action. The computing platform may send the storage notification and one or more commands directing the data storage system to store the storage notification, which may cause the data storage system to store the storage notification. The computing platform may send the storage notification and one or more commands directing the user device to display the storage notification, which may cause the user device to display the storage notification.

In one or more examples, the data storage system may be simultaneously accessible by a plurality of different computing devices located in different geographic regions using login credentials associated with each of the plurality of different computing devices. In one or more examples, the data storage system may be simultaneously accessible by a plurality of different computing devices located in different geographic regions using a variable token replacement scheme.

In one or more instances, the application may be stored locally at the user device. In one or more instances, the computing platform may send one or more commands directing the user device to transfer the application from the user device to the computing platform. In one or more instances, the machine learning engine may be refined based on the first error remediation information, the first confidence threshold, and whether the first action successfully corrected the first error at the first confidence threshold, and/or other information.

In one or more examples, the machine learning engine may be trained using both supervised and unsupervised learning processes. In one or more examples, the historical error data may include previous historical errors and corresponding actions that successfully corrected the previous historical errors or failed to correct the previous historical errors. In one or more examples, the first threshold dynamically may be adjusted based on a percentage of actions that successfully corrected corresponding errors at the first threshold.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which:

FIGS. 2A-2H depict an illustrative event sequence for implementing a development test automation framework to automatically detect, analyze, and correct errors in a given application in accordance with one or more example embodiments;

FIG. 4 depicts an illustrative graphical user interface for implementing a development test automation framework to automatically detect, analyze, and correct errors in a given application in accordance with one or more example embodiments;

FIG. 5 depicts an illustrative diagram for implementing a development test automation framework to automatically detect, analyze, and correct errors in a given application in accordance with one or more example embodiments; and FIGS. 6A-6C depict illustrative graphical user interfaces for implementing a development test automation framework to automatically detect, analyze, and correct errors in a given application in accordance with one or more example embodiments.

DETAILED DESCRIPTION

Figure 1A:
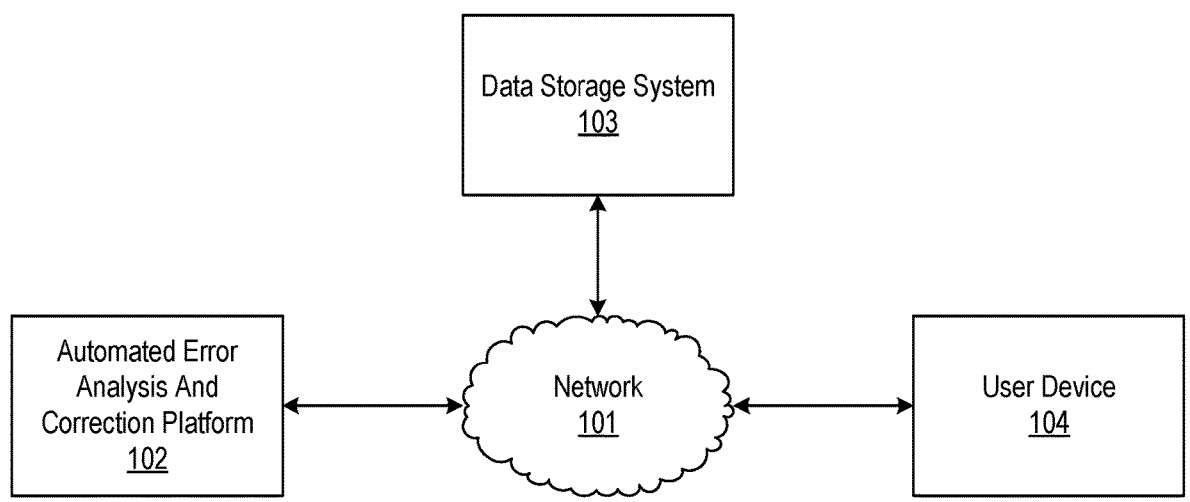
FIGS. 1A-1B depict an illustrative computing environment for implementing a development test automation framework to automatically detect, analyze, and correct errors in a given application in accordance with one or more example embodiments.

In the following description of various illustrative embodiments, reference is made to the accompanying drawings, which form a part hereof, and in which is shown, by way of illustration, various embodiments in which aspects of the disclosure may be practiced. In some instances, other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

As a brief introduction to the concepts described further herein, one or more aspects of the disclosure relate to the automatic detection, analysis, and correction of errors in an application. An application is a computer software package that performs a specific function (e.g., word processors, database programs, web browsers, deployment tools, image editors, communication platforms, and the like). During the development of an application, an application developer may unintentionally introduce errors in the application such that the application might not be able to function properly. The application may undergo a quality control process in order to discover and correct errors. Current methods may require an application developer to manually review the application's software package to discover any potential errors. However, there may be problems associated with the manual method. For example, because the process is manual, errors may be missed due to human error. Additionally, the manual method may be time intensive and inefficient to perform, especially in the case of developing a plurality of applications. Accordingly, there is a need for a method to automatically detect, analyze, and correct errors in an application so as to increase the accuracy and efficiency of error detection and correction.

Accordingly, it may be advantageous to develop a development test automation framework that may automatically detect, analyze, and correct errors in an application. In some instances, the development test automation framework may leverage existing software development tools. In some instances, the development test automation framework may utilize a variable token replacement scheme. In some instances, the development test automation framework may support custom functions. In some instances, the development test automation framework may support dynamic scripting for data transformation, comparison of data tables, and/or files across different data sources. In some instances, the development test automation framework may support mainframe terminal emulators.

In some instances, after an application has been developed, the application may go through a quality control process. During the quality control process, the application may be scanned in order to identify objects in the application's software package. Subsequently, a file may be generated that may include the objects, and test cases that correspond to the objects may be generated. The test cases may be executed in order to identify if any errors exist with respect to the application objects. In some instances, the results of the test cases may utilize centralized reporting. In some instances, tests may be executed using continuous integration and continuous delivery (CI/CD). In some instances, test results may be published using a subscriber data management (SDM) system or an application lifestyle management (ALM) system. In some instances, testing may adhere fully to shift-left methodology.

In some instances, a machine learning model may be trained to identify actions that may correct corresponding errors, based on a certain level of confidence that an action will successfully correct a corresponding error. In some instances, the machine learning model may compare a confidence threshold to the level of confidence and, in response to a level of confidence greater than the confidence threshold, automatically correct an error the using the corresponding action. These and other features are described in further detail below.

Figure 1B:
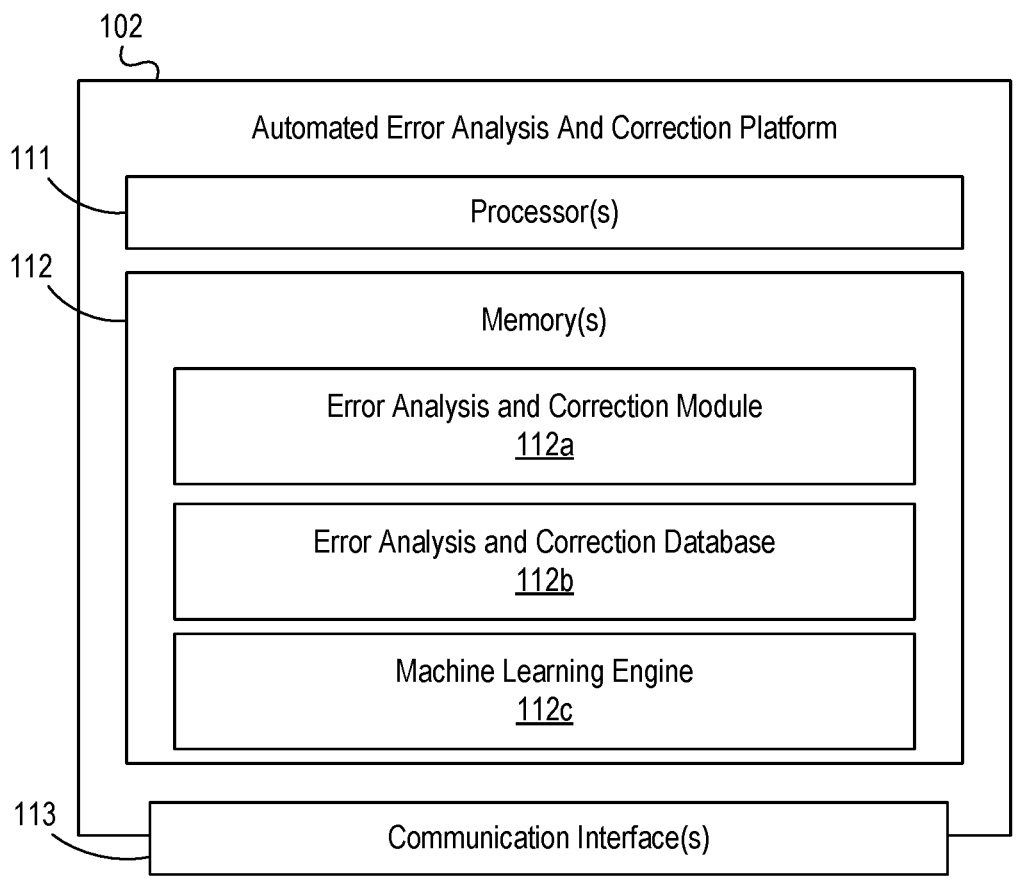

FIGS. 1A-1B depict an illustrative computing environment for implementing a development test automation framework to automatically detect, analyze, and correct errors in a given application in accordance with one or more example embodiments. Referring to FIG. 1A, computing environment 100 may include one or more computer systems. For example, computing environment 100 may include an automated error analysis and correction platform 102, a data storage system 103, and user device 104.

As described further below, automated error analysis and correction platform 102 may be a computer system that includes one or more computing devices (e.g., servers, server blades, or the like) and/or other computer components (e.g., processors, memories, communication interfaces) that may be used to train, host, and/or otherwise refine a machine learning engine, which may be used to automatically analyze and correct errors in an application.

Data storage system 103 may include one or more computing devices and/or other computer components (e.g., processors, memories, communication interfaces). In some instances, data storage system 103 may include one or more data sources that may store historical error information, which may be used to train a machine learning engine to automatically analyze and correct errors in an application. Data storage system 103, and any information stored in data storage system 103, may be accessible by a plurality of user computing devices (such as a laptop computer, desktop computer, mobile device, tablet, smartphone, or the like) in a plurality of different geographic locations simultaneously. In some instances, the user computing devices (e.g., user device 104) may access the data storage system 103 using individual login credentials. In some instances, the data storage system may use a variable token replacement scheme in addition or as an alternative to using individual login credentials. For example, a variable token may be used in place of or in addition to an individual login credential, in which the variable token may be dynamically configured based on which of the user computing devices is accessing the data storage system 103. As a result, it might not be necessary for a user computing device (e.g., user device 104) to use an associated login credential each time the user computing device attempts to access the data storage system 103.

In some instances, data storage system 103 may be configured as a cloud storage system, in which data storage system 103 may be a cloud computing model that stores information on the Internet through a cloud computing provider who manages and operates data storage system 103 as a service. In some instances, data storage system 103 may be local or non-cloud based storage, or may support cloud based storage. In some instances, the data storage system 103 may be configured to store information related to an application, errors associated with the application, actions that correspond to the errors, and the like.

User device 104 may be a laptop computer, desktop computer, mobile device, tablet, smartphone, and/or other device, which may host, run, or otherwise execute an application that may, in some instances, contain errors. In some instances, user device 104 may be a user computing device that is used by an individual. In some instances, user device 104 may be an enterprise computing device that is used by an administrator to host, run, or otherwise execute an application on the user device 104. In some instances, user device 104 may be configured to display one or more user interfaces (e.g., interfaces depicting a notification that an error has been automatically corrected, or the like).

Computing environment 100 also may include one or more networks, which may interconnect automated error analysis and correction platform 102, data storage system 103, and user device 104. For example, computing environment 100 may include a network 101 (which may interconnect, e.g., automated error analysis and correction platform 102, data storage system 103, and user device 104).

In one or more arrangements, automated error analysis and correction platform 102, data storage system 103, and user device 104 may be any type of computing device capable of sending and/or receiving requests and processing the requests accordingly. For example, automated error analysis and correction platform 102, data storage system 103, and user device 104, and/or the other systems included in computing environment 100 may, in some instances, be and/or include server computers, desktop computers, laptop computers, tablet computers, smart phones, or the like that may include one or more processors, memories, communication interfaces, storage devices, and/or other components. As noted above, and as illustrated in greater detail below, any and/or all of automated error analysis and correction platform 102, data storage system 103, and user device 104 may, in some instances, be special-purpose computing devices configured to perform specific functions.

Referring to FIG. 1B, automated error analysis and correction platform 102 may include one or more processors 111, memory 112, and communication interface 113. A data bus may interconnect processor 111, memory 112, and communication interface 113. Communication interface 113 may be a network interface configured to support communication between automated error analysis and correction platform 102 and one or more networks (e.g., network 101, or the like). Memory 112 may include one or more program modules having instructions that when executed by processor 111 cause automated error analysis and correction platform 102 to perform one or more functions described herein and/or one or more databases that may store and/or otherwise maintain information which may be used by such program modules and/or processor 111. In some instances, the one or more program modules and/or databases may be stored by and/or maintained in different memory units of automated error analysis and correction platform 102 and/or by different computing devices that may form and/or otherwise make up automated error analysis and correction platform 102. For example, memory 112 may have, host, store, and/or include error analysis and correction module 112a, error analysis and correction database 112b, and/or machine learning engine 112c.

Error analysis and correction module 112a may have instructions that direct and/or cause automated error analysis and correction platform 102 to analyze and correct errors, as discussed in greater detail below. Error analysis and correction database 112b may store information used by error analysis and correction module 112a and/or automated error analysis and correction platform 102 in application of advanced techniques to perform error analysis and correction, and/or in performing other functions. Machine learning engine 112c may be used by automated error analysis and correction platform 102 and/or error analysis and correction module 112a to refine and/or otherwise update methods for analyzing and correcting errors in an application, and/or other methods described herein.

Figure 2A:
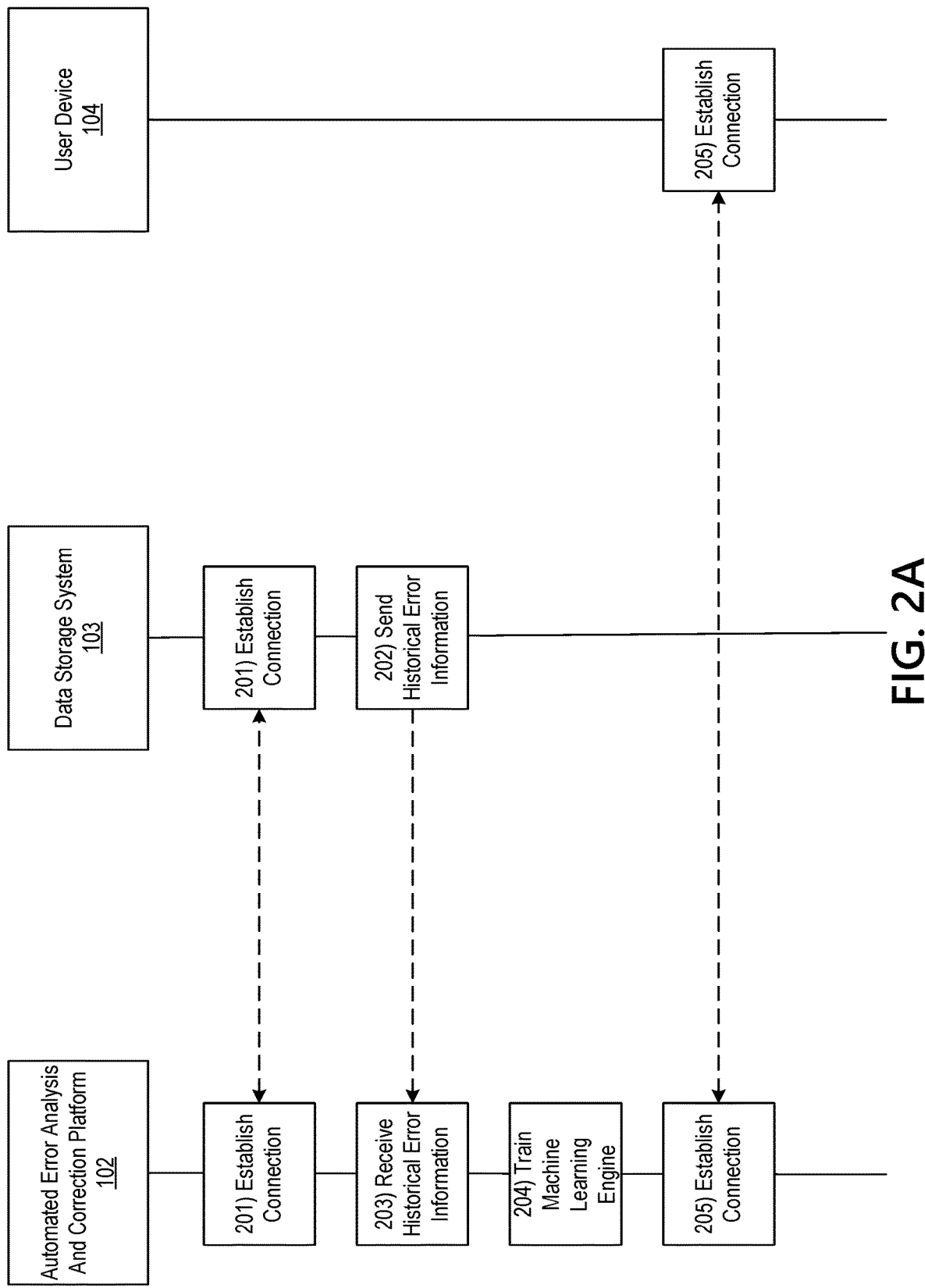

FIGS. 2A-2H depict an illustrative event sequence for implementing a development test automation framework to automatically detect, analyze, and correct errors in a given application in accordance with one or more example embodiments. Referring to FIG. 2A, at step 201, the automated error analysis and correction platform 102 may establish a connection with data storage system 103. For example, the data storage system 103 may establish a first wireless data connection with the automated error analysis and correction platform 102 to link the data storage system 103 to the automated error analysis and correction platform 102 (e.g., in preparation for sending historical error information). In some instances, the data storage system 103 may identify whether or not a connection is already established with the automated error analysis and correction platform 102. If a connection is already established with the automated error analysis and correction platform 102, the data storage system 103 might not re-establish the connection. If a connection is not already established with the automated error analysis and correction platform 102, the data storage system 103 may establish the first wireless data connection as described herein.

At step 202, the data storage system 103 may send historical error information to the automated error analysis and correction platform 102. For example, the data storage system 103 may send the historical error information to the automated error analysis and correction platform 102 while the first wireless data connection is established. For example, the data storage system 103 may send previous errors and corresponding actions that successfully corrected the previous errors, or previous errors and corresponding actions that unsuccessfully corrected the previous errors.

At step 203, the automated error analysis and correction platform 102 may receive the historical error information sent at step 202. For example, the automated error analysis and correction platform 102 may receive the historical error information via the communication interface 113 and while the first wireless data connection is established.

Although steps 202 and 203 are described with regard to historical error information, the data storage system 103 may, in some instances, additionally or alternatively send real time information (similar to the historical error information) at any point throughout the illustrative event sequence without departing from the scope of the disclosure. For example, real time information may be sent from one or more data sources, which may, e.g., include user computing devices, and/or other data sources.

In some instances, the automated error analysis and correction platform 102 may collect historical error information for the analysis and correction of errors in a plurality of applications across a plurality of computing devices (which may, e.g., include the data storage system 103 and user device 104). For example, the automated error analysis and correction platform 102 may collect information about previous errors and corresponding actions from the plurality of applications across the plurality of computing devices.

Additionally or alternatively, the historical error information may include previous errors and corresponding actions that successfully corrected the previous errors, previous errors and corresponding actions that unsuccessfully corrected the previous errors, and/or other information. Additionally or alternatively, the historical error information may include information about the level of confidence that a particular action would successfully correct a corresponding error (which may, e.g., be based on historical error correction/remediation). Additionally or alternatively, the historical error information may include a percentage of actions that successfully corrected corresponding errors based on a particular level of confidence. Additionally or alternatively, the historical error information may include a percentage of actions that unsuccessfully corrected corresponding errors based on a particular level of confidence.

At step 204, the automated error analysis and correction platform 102 may train or otherwise configure a machine learning engine, using the historical error information, to automatically analyze and correct errors. In some instances, the automated error analysis and correction platform 102 may train the machine learning engine using data that may include errors, actions corresponding to the errors, the level of confidence that a given action may successfully correct an error, and/or other information. For example, the automated error analysis and correction platform 102 may train the machine learning engine to identify and/or otherwise compute a confidence score, which may represent a level of confidence that a particular action will correct a corresponding error. In some instances, the confidence score may be a numerical value (e.g., 0.9). In some instances, the confidence score may be a percentage (e.g., 90%). In some instances, automated error analysis and correction platform 102 may train the machine learning engine based on the percentage of times actions successfully corrected corresponding errors with respect to a particular confidence score (e.g., 95% success rate at a confidence score of 0.9). Additionally or alternatively, the automated error analysis and correction platform 102 may train the machine learning engine based on the percentage of times actions unsuccessfully corrected corresponding errors with respect to a particular confidence score (e.g., 15% failure rate at a confidence score of 0.7).

In some instances, the machine learning engine may utilize supervised learning, in which labeled data sets may be input into the machine learning engine (e.g., information including errors, actions corresponding to the errors, the level of confidence that a given action may successfully correct an error, and the like), which may be used to classify information and accurately predict outcomes with respect to error analysis and correction. Using labeled inputs and outputs, the machine learning engine may measure its accuracy and learn over time. For example, supervised learning techniques such as linear regression, classification, neural networking, and/or other supervised learning techniques may be used.

Additionally or alternatively, the machine learning engine may utilize unsupervised learning, in which unlabeled data may be input into the machine learning engine. For example, unsupervised learning techniques such as k-means, gaussian mixture models, frequent pattern growth, and/or other unsupervised learning techniques may be used. In some instances, the machine learning engine may be a combination of supervised and unsupervised learning. In doing so, the automated error analysis and correction platform 102 may dynamically and continuously update and/or otherwise refine the machine learning engine so as to increase accuracy of the machine learning engine over time.

At step 205, the user device 104 may establish a connection with the automated error analysis and correction platform 102. For example, the user device 104 may establish a second wireless data connection with the automated error analysis and correction platform 102 to link the user device 104 to the automated error analysis and correction platform 102 (e.g., in preparation for sending a request to scan an application). In some instances, the user device 104 may identify whether or not a connection is established with the automated error analysis and correction platform 102. If a connection is already established with the automated error analysis and correction platform 102, the user device 104 might not re-establish the connection. If a connection is not yet established with the automated error analysis and correction platform 102, the user device 104 may establish the second wireless data connection as described herein.

Figure 2B:
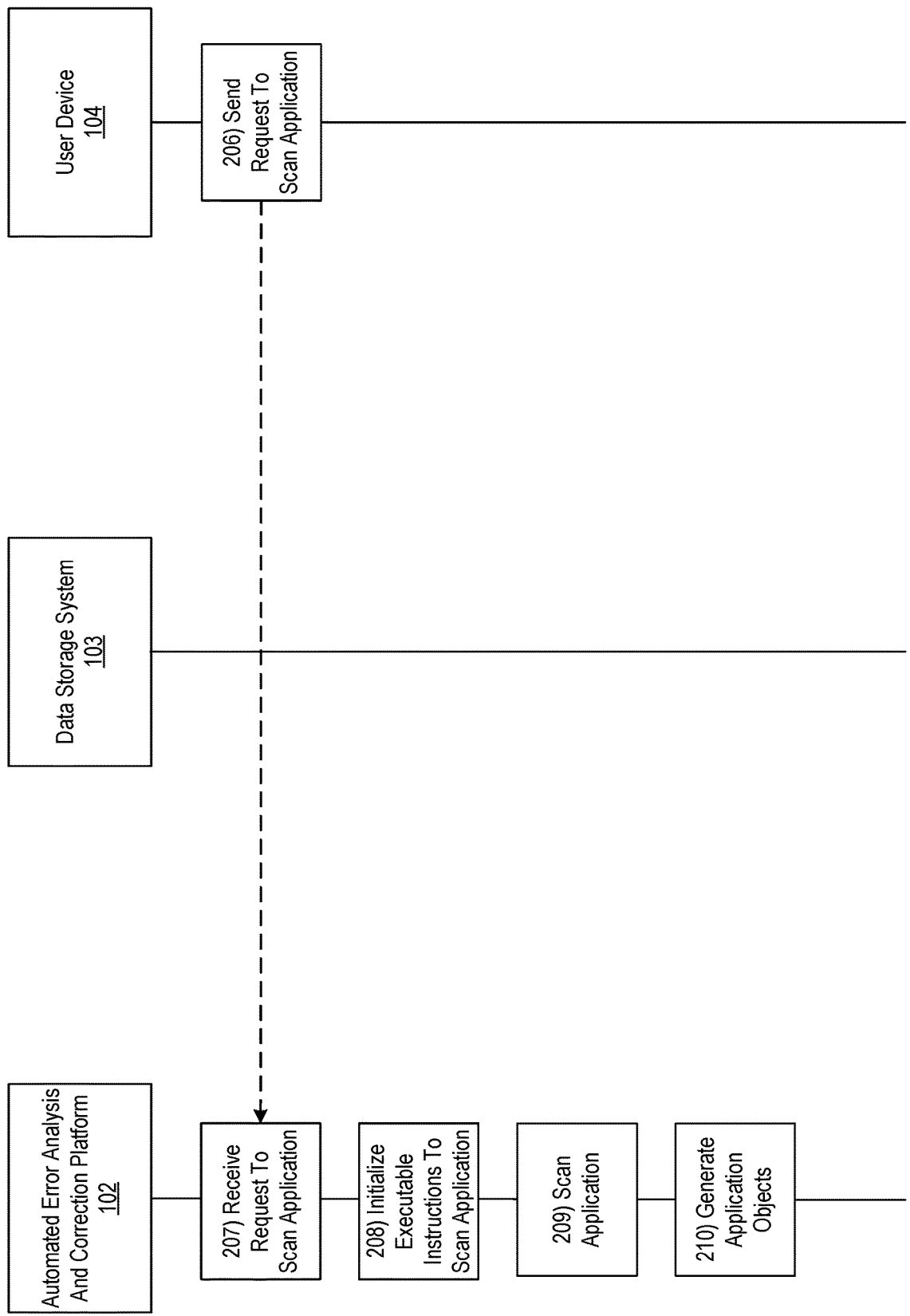

Referring to FIG. 2B, at step 206, the user device 104 may send a request to scan an application to the automated error analysis and correction platform 102. For example, the user device 104 may send the request to scan an application to the automated error analysis and correction platform 102 while the second wireless data connection is established. The request to scan an application may include information that, when received by the automated error analysis and correction platform 102, may identify the particular application to be scanned.

At step 207, the automated error analysis and correction platform 102 may receive the request to scan an application. For example, the automated error analysis and correction platform 102 may receive the application scanning request via the communication interface 113 and while the second wireless data connection is established. In some instances, the application scanning request may include the application itself, if the application is stored locally on the user device 104. In some instances, the automated error analysis and correction platform 102 may, in response to receiving the application scanning request, send commands to the user device 104, directing the user device 104 to transfer the application from the user device 104 to the automated error analysis and correction platform 102. In some instances, the application may be stored on the automated error analysis and correction platform 102. In some instances, the application scanning request may contain a location in which the automated error analysis and correction platform 102 may access the application.

Although the transmission and receipt of the application scanning request and other information are described at steps 206 and 207, additional information may also be sent to and/or received by the automated error analysis and correction platform 102 without departing from the scope of the disclosure (e.g., a request to scan a plurality of applications rather than a single application). In some instances, information may be sent by the user device 104, data storage system 103, and/or one or more computing devices.

At step 208, the automated error analysis and correction platform 102 may initialize executable instructions configured to scan an application. In some instances, the instructions may be stored at the automated error analysis and correction platform 102, such as in memory 112. In some instances, the instructions may be stored at a computing device (i.e., data storage system, user device 104), which the automated error analysis and correction platform 102 may access, using, for example, the first and/or second wireless data connection. The instructions, when executed, may direct the automated error analysis and correction platform 102 to scan the application that has been requested by the user device 104.

At step 209, the automated error analysis and correction platform 102 may scan the application that was requested by the user device 104. In some instances, scanning the application may include using the automated error analysis and correction platform 102 to evaluate the application's software package in order to identify the characteristics and features of the application (e.g., property and use rights, programming language, output and purpose, etc.) In some instances, the automated error analysis and correction platform 102 may generate a plurality of objects that correspond to particular features and attributes of the application (e.g., user interface, authentication, notifications, data caching, etc.)

At step 210, the automated error analysis and correction platform 102 may generate objects based on the application that has been scanned. For example, the automated error analysis and correction platform 102 may generate an abstract object data type that was initially created by an application developer. In some instances the automated error analysis and correction platform 102 may generate an object that may include multiple properties and methods, and in some instances may contain other objects. For example, the automated error analysis and correction platform 102 may generate an object that may be a user account created for a website, and may contain attributes such as a first name, last name, email address, password, location, photo, and/or other attributes.

Referring to FIG. 2C, at step 211, the automated error analysis and correction platform 102 may generate test cases, in which each particular test case may correspond to a particular object that was generated when the application was scanned. In some instances, test cases may include information relating to the objects, such as object attributes (e.g., name, description, data type, and/or other attributes). Each test case may be executed by the automated error analysis and correction platform 102 in order to determine if an error is associated with a corresponding object. Test cases may be generated using a plain language format, such as Gherkin syntax. In some instances, test cases may include saving a document, printing a file, opening a window, and/or other computing actions.

At step 212, the automated error analysis and correction platform 102 may initiate a test case protocol. The test case protocol may include instructions that, when executed, automatically loop through each of the test cases that were previously generated in step 211. The test case protocol may determine if any errors are associated with corresponding objects in the application. In some instances, a subset of the test cases may be selected for the test case protocol.

At step 213, the automated error analysis and correction platform 102 may output test result information based on the results of the test case protocol initiated in step 212. In some instances, the automated error analysis and correction platform 102 may output test result information relating to whether an error or errors have been detected in the application. In some instances, the automated error analysis and correction platform 102 may output test result information relating to actions that correspond to the errors. In some instances, the automated error analysis and correction platform 102 may output a plurality of actions that correspond to a particular error.

In some instances, the automated error analysis and correction platform 102 may display a graphical user interface similar to graphical user interface 405, which is illustrated in FIG. 4. For example, the automated error analysis and correction platform 102 may display information related to the total number of test cases that were initiated in step 212, the number of objects that passed the test case protocol, the number of errors that were discovered, and/or other information.

At step 214, the automated error analysis and correction platform 102 may input the test result information of steps 212 and 213 into the machine learning engine (e.g., the machine learning engine trained at step 204). The machine learning engine may use the inputted test result information to identify error remediation information and/or a confidence score that corresponds to the error remediation information. In some instances, in generating the error remediation information, the automated error analysis and correction platform 102 may identify an error or a plurality of errors, and a corresponding action or actions that the machine learning engine has identified may correct the error or errors. In some instances, the automated error analysis and correction platform 102 may generate a numerical value or percentage that represents a level of confidence at which the machine learning engine has determined that an error or errors will be successfully corrected by a corresponding action or actions. For example, a high confidence score (e.g., 0.9, or 90%) may represent a high level of confidence that an action will successfully correct a corresponding error, and a low confidence score (e.g., 0.5, or 50%) may represent a low level of confidence that an action will successfully correct a corresponding error.

In some instances, the automated error analysis and correction platform 102 may identify a plurality of actions corresponding to a particular error, and a plurality of confidence scores that correspond to the plurality of actions. In some instances, the automated error analysis and correction platform 102 may identify an action among the plurality of actions with the highest confidence score to use in association with the error and the error remediation information.

Figure 2D:
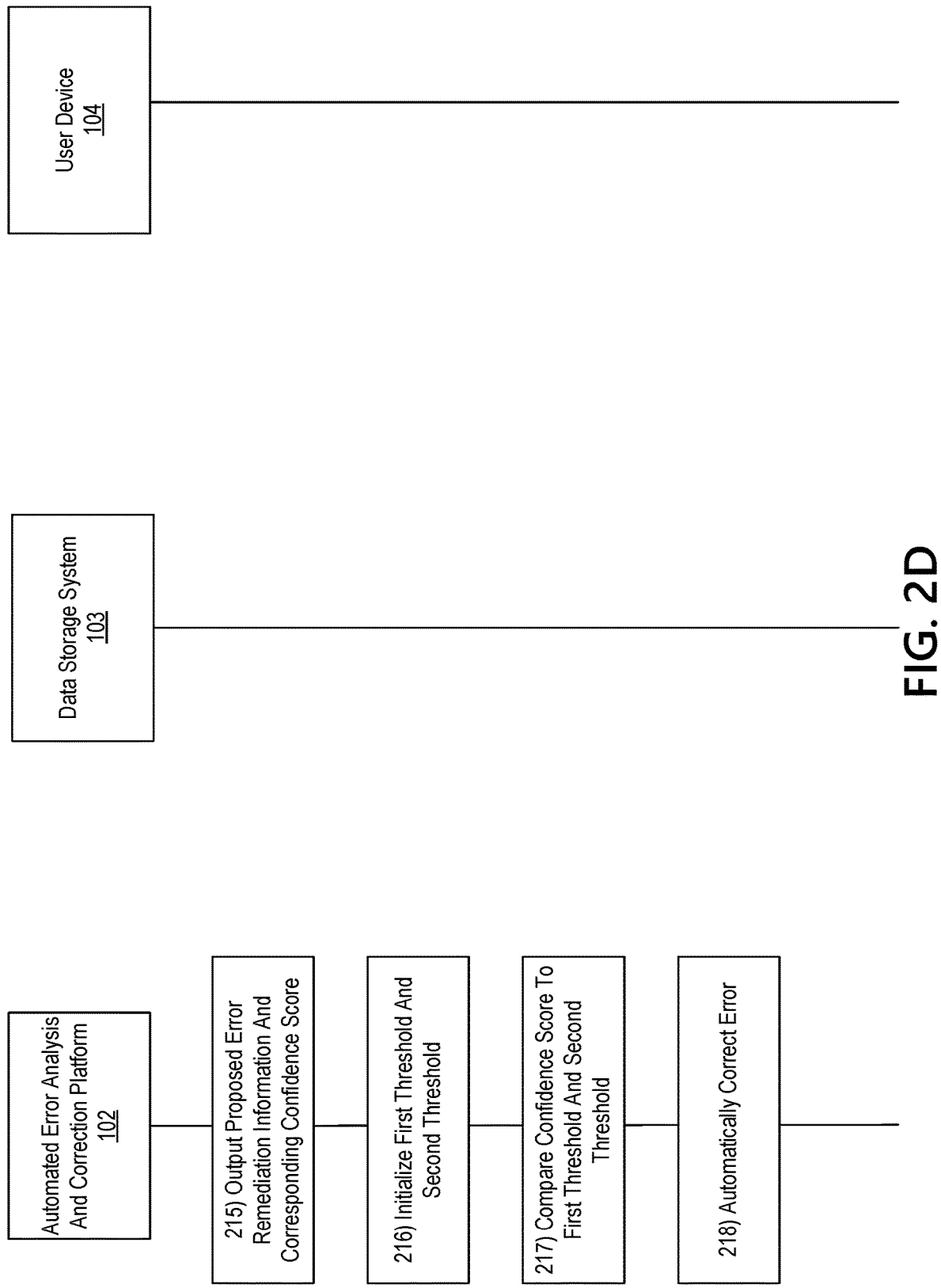

Referring to FIG. 2D, at step 215, the automated error analysis and correction platform 102 may output the proposed error remediation information and corresponding confidence score in, for instance, a user interface, similar to interface 505, which is illustrated in FIG. 5. For example, the proposed error remediation information may include the error itself and an action that may correct the error. In some instances, the proposed error remediation information may include a plurality of errors and a plurality of actions corresponding to the plurality of errors. In some instances, the automated error analysis and correction platform 102 may generate a plurality of actions that correspond to a particular error.

At step 216, the automated error analysis and correction platform 102 may initialize a first threshold and a second threshold. In some instances, the first threshold and the second threshold may be stored in memory 112 as predetermined numerical values or percentages. For example, the first threshold may be a value that represents a high level of confidence (e.g., 0.9). The second threshold may represent a medium level of confidence or a low level of confidence, with a value that is lower than the first threshold (e.g., 0.7). In some instances, there may be a single threshold, rather than a first threshold and a second threshold. In some instances, there may be a plurality of thresholds, representing varying levels of confidence (e.g., low—0.5, medium—0.7, high—0.9) that an action may successfully correct a corresponding error.

In some instances, the first threshold and/or the second threshold may be dynamically configured based on feedback to the automated error analysis and correction platform 102. In some instances, feedback may include the percentage of actions that previously successfully corrected corresponding errors based on the relation of the confidence score to the first threshold and/or the second threshold. For example, if there is a low percentage of actions (e.g., 50%) that successfully corrected errors based on a confidence score that exceeded the first threshold (e.g., 0.9), that may signal that the first threshold is too low and should be increased (e.g., increase 0.9 to 0.95). In some instances, feedback may include the percentage of actions that previously unsuccessfully corrected corresponding errors based on the relations of the confidence score to the first threshold and the second threshold. For example, if there is a high percentage of actions (e.g., 95%) that unsuccessfully corrected corresponding errors based on a confidence score that exceeded the second threshold (e.g., 0.7), that may signal the second threshold is too low and should be increased (e.g., increase 0.7 to 0.75).

At step 217, the automated error analysis and correction platform 102 may compare the confidence score to the first threshold and the second threshold. For example, if the confidence score meets or exceeds the first threshold, then the automated error analysis and correction platform may proceed to step 218. If the confidence score does not meet or exceed the first threshold but meets or exceeds the second threshold, then the automated error analysis and correction platform 102 may proceed to step 226. If the confidence score does not meet or exceed the first threshold and also does not meet or exceed the second threshold, then the automated error analysis and correction platform 102 may proceed to step 233.

At step 218, the automated error analysis and correction platform 102 may automatically correct the error based on comparing the confidence score to the first threshold and the second threshold performed in step 217. For example, step 218 may represent a high level of confidence (e.g., 0.9) that an action will successfully correct a corresponding error.

Referring to FIG. 2E, at step 219, the automated error analysis and correction platform 102 may generate a correction notification. In some instances, in generating the correction notification, the automated error analysis and correction platform 102 may include information about the error, the action that corrected the error, the associated confidence score, the relation of the confidence score to the first threshold and the second threshold, and/or other information. In some instances, in generating the correction notification, the automated error analysis and correction platform 102 may further include information about the application, the object that was generated during the application scan, and the test case that corresponded to the object and error. In some instances, in generating the correction notification, the automated error analysis and correction platform 102 may further include information explaining in more detail any of the previously mentioned details.

At step 220, the automated error analysis and correction platform 102 may send the error correction notification to the user device 104. In some instances, the error analysis and correction platform 102 may send the correction notification to the user device 104 via the communication interface 113 and while the second wireless data connection is established.

At step 221, the user device 104 may receive the correction notification. In some instances, the correction notification may include one or more commands, that, when received by the user device 104, directs the user device 104 to display the correction notification. At step 222, based on or in response to the one or more commands directing the user device 104 to display the correction notification, the user device 104 may display the correction notification received at step 211. For example, the user device 104 may display a graphical user interface similar to graphical user interface 605, which is illustrated in FIG. 6A.

At step 223, the automated error analysis and correction platform 102 may send the correction notification to the data storage system 103. In some instances, the error analysis and correction platform 102 may send the correction notification to the data storage system 103 via the communication interface 113 and while the first wireless data connection is established.

Figure 2F:
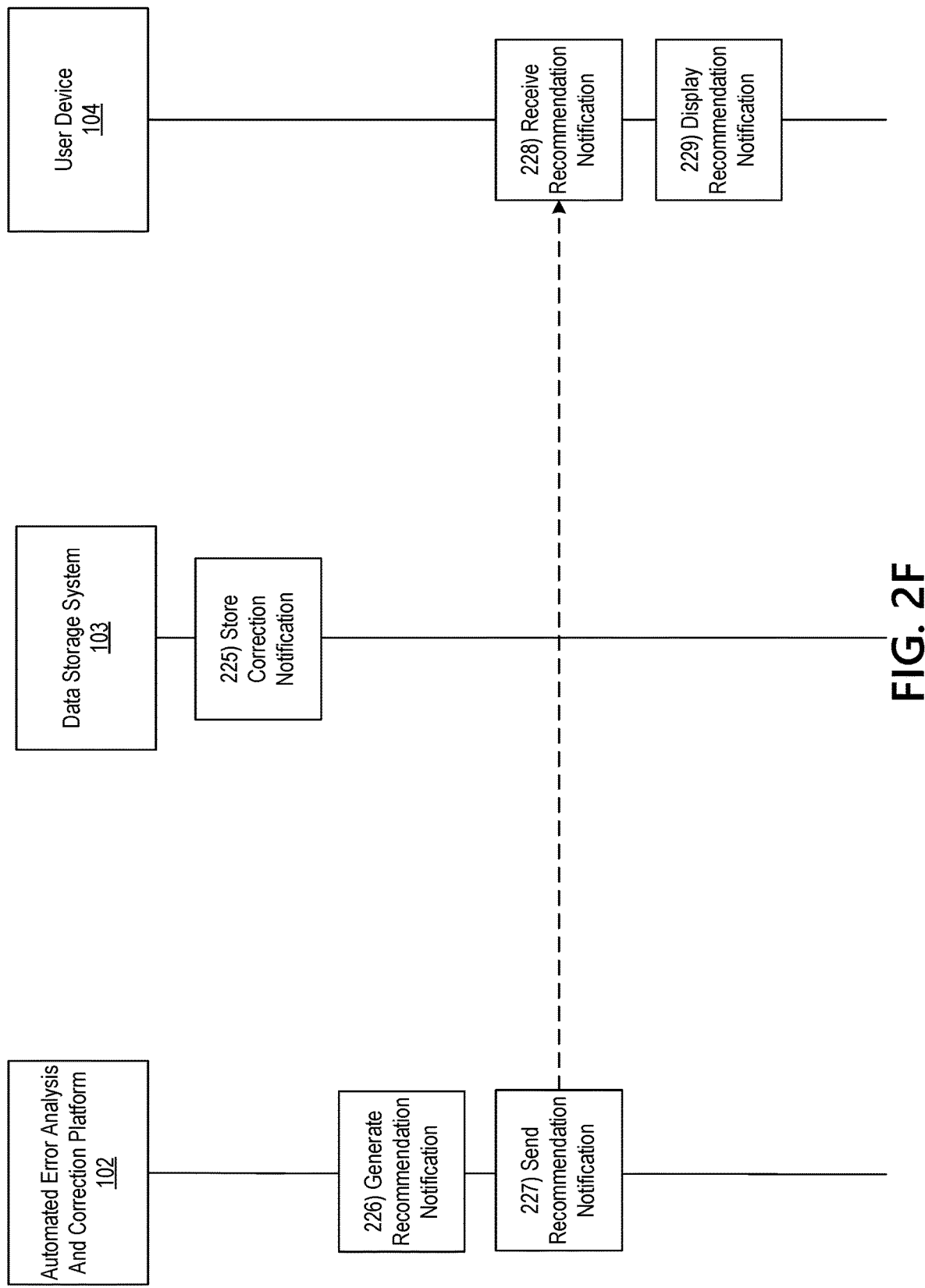

At step 224, the data storage system may receive the correction notification. The correction notification may include one or more commands, that, when received by the data storage system 103, directs the data storage system 103 to store the correction notification. Referring to FIG. 2F, at step 225, based on or in response to the one or more commands directing the data storage system 103 to store the correction notification, the data storage system 103 may store the correction notification received at step 224.

At step 226, the automated error analysis and correction platform 102 may generate a recommendation notification based on comparing the confidence score to the first threshold and the second threshold performed in step 217. For example, step 226 may represent a medium level of confidence (e.g., 0.7) that an action will successfully correct a corresponding error. In some instances, in generating the recommendation notification, the automated error analysis and correction platform 102 may include an indication that the confidence score was too low to automatically correct the error.

In some instances, in generating the recommendation notification, the automated error analysis and correction platform 102 may include information about the error, the action that may correct the error, the associated confidence score, and the relation of the confidence score to the first threshold and the second threshold. In some instances, in generating the recommendation notification, the automated error analysis and correction platform 102 may further include information about the application, the object that was generated during the application scan, and the test case that corresponded to the object and error. In some instances, in generating the recommendation notification, the automated error analysis and correction platform 102 may further include information explaining in more detail any of the previously mentioned details.

At step 227, the automated error analysis and correction platform 102 may send the recommendation notification to the user device 104. In some instances, the error analysis and correction platform 102 may send the recommendation notification to the user device 104 via the communication interface 113 and while the second wireless data connection is established. At step 228, the user device 104 may receive the recommendation notification. The recommendation notification may include one or more commands, that, when received by the user device 104, directs the user device 104 to display the recommendation notification.

At step 229, based on or in response to the one or more commands directing the user device 104 to display the recommendation notification, the user device 104 may display the recommendation notification received at step 228. For example, the user device 104 may display a graphical user interface similar to graphical user interface 610, which is illustrated in FIG. 6B.

Figure 2G:
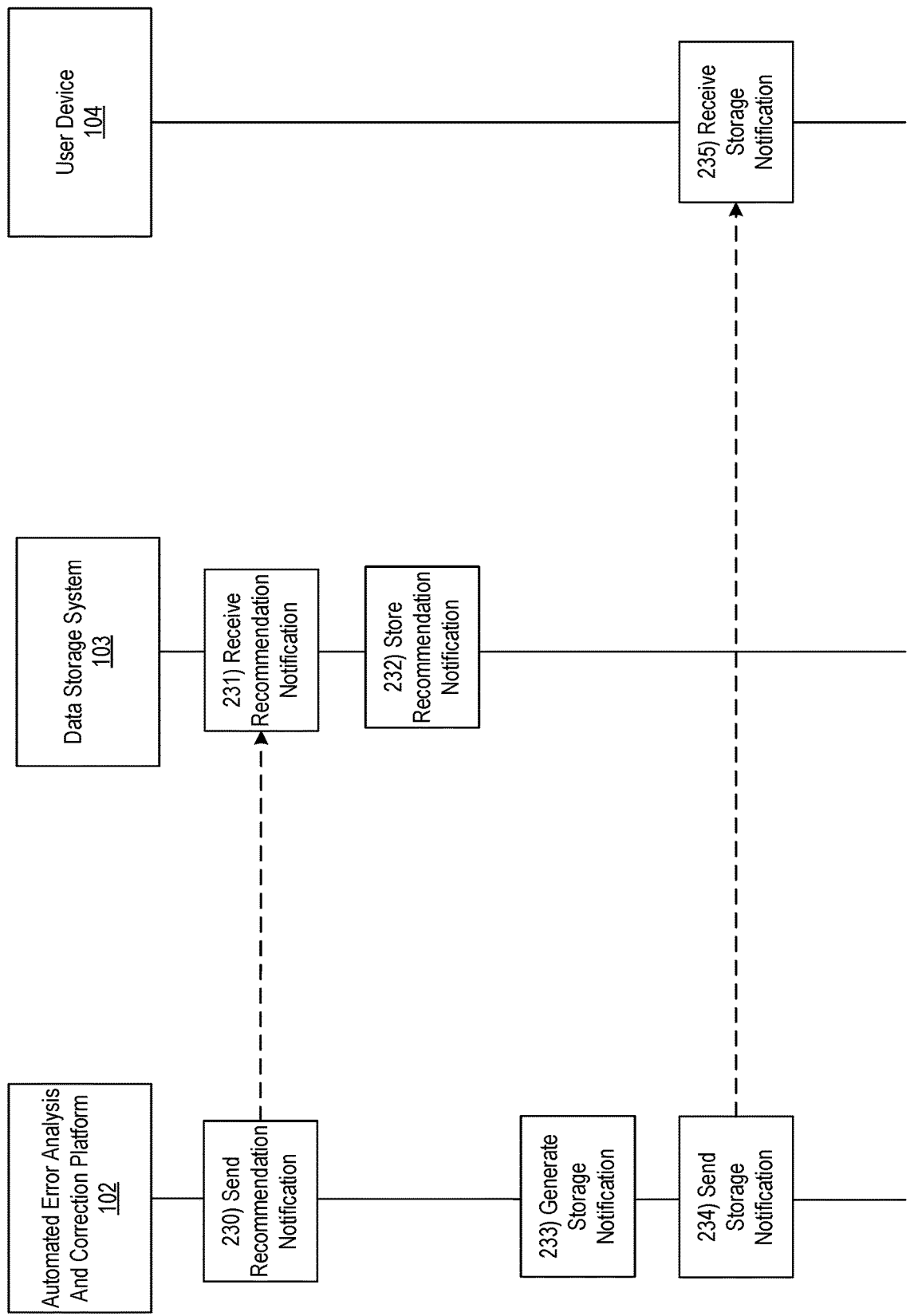

Referring to FIG. 2G, at step 230, the automated error analysis and correction platform 102 may send the recommendation notification to the data storage system 103. In some instances, the error analysis and correction platform 102 may send the recommendation notification to the data storage system 103 via the communication interface 113 and while the first wireless data connection is established.

At step 231, the data storage system may receive the recommendation notification. The recommendation notification may include one or more commands, that, when received by the data storage system 103, directs the data storage system 103 to store the recommendation notification. At step 232, based on or in response to the one or more commands directing the data storage system 103 to store the recommendation notification, the data storage system 103 may store the recommendation notification received at step 231.

At step 233, the automated error analysis and correction platform 102 may generate a storage notification based on comparing the confidence score to the first threshold and the second threshold performed in step 217. For example, step 223 may represent a low level of confidence (e.g., 0.5) that an action will successfully correct a corresponding error. In some instances, in generating the storage notification, the automated error analysis and correction platform 102 may include an indication that the confidence score was too low to automatically correct the error, or that the confidence score was too low to recommend to correct the error. In some instances, in generating the storage notification, the automated error analysis and correction platform 102 may include an indication that an action has not been identified to correct a corresponding error, and that further review may be necessary.

In some instances, in generating the storage notification, the automated error analysis and correction platform 102 may include information about the error, the action that corrected the error, the associated confidence score, and the relation of the confidence score to the first threshold and the second threshold. In some instances, in generating the storage notification, the automated error analysis and correction platform 102 may further include information about the application, the object that was generated during the application scan, and the test case that corresponded to the object and error. In some instances, in generating the storage notification, the automated error analysis and correction platform 102 may further include information explaining in more detail any of the previously mentioned details.

At step 234, the automated error analysis and correction platform 102 may send the storage notification to the user device 104. In some instances, the error analysis and correction platform 102 may send the storage notification to the user device 104 via the communication interface 113 and while the second wireless data connection is established. At step 235, the user device 104 may receive the storage notification. The storage notification may include one or more commands, that, when received by the user device 104, direct the user device 104 to display the storage notification.

Figure 2H:
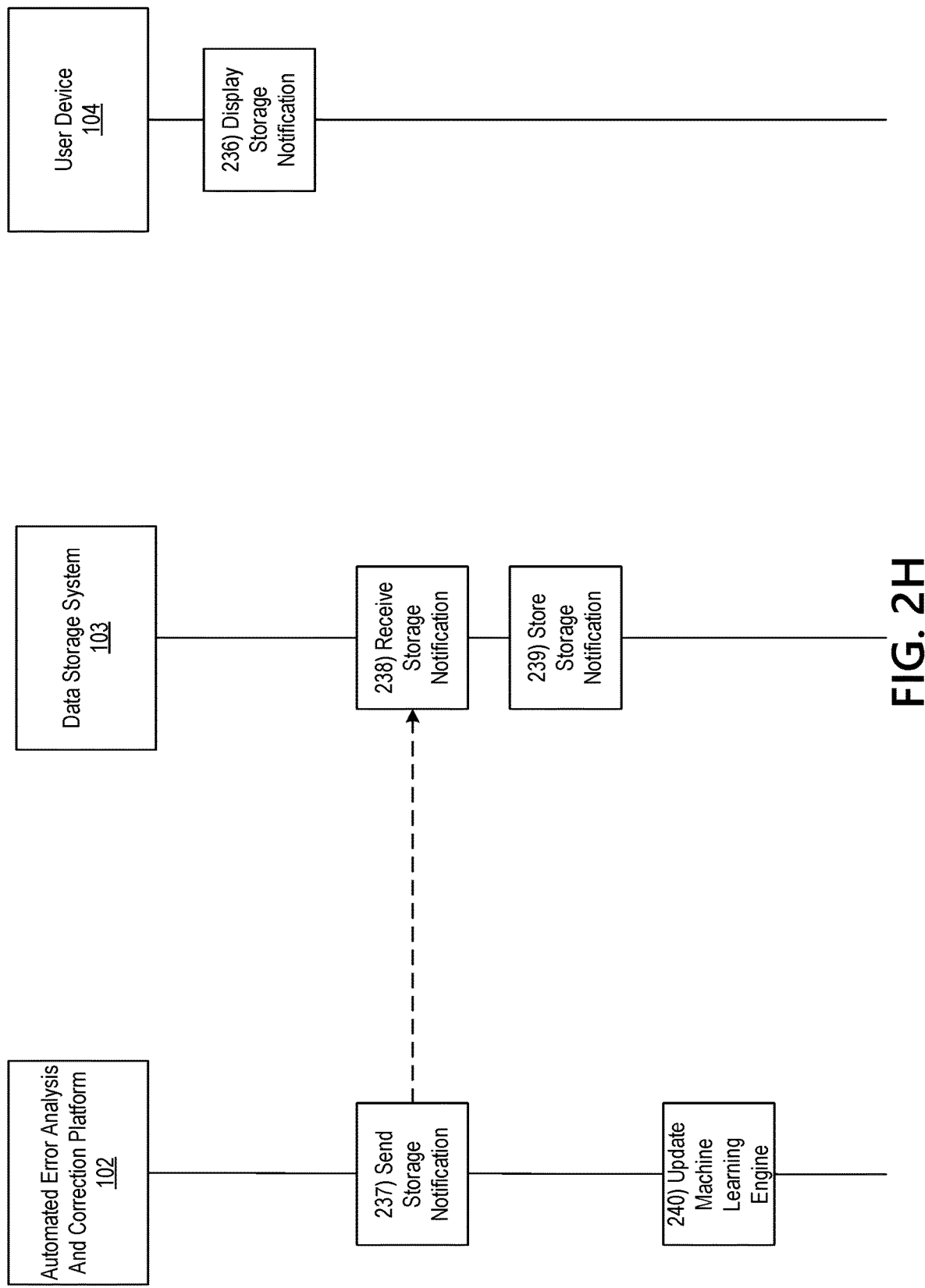

Referring to FIG. 2H, at step 236, based on or in response to the one or more commands directing the user device 104 to display the storage notification, the user device 104 may display the storage notification received at step 235. For example, the user device 104 may display a graphical user interface similar to graphical user interface 615, which is illustrated in FIG. 6C.

At step 237, the automated error analysis and correction platform 102 may send the storage notification to the data storage system 103. In some instances, the error analysis and correction platform 102 may send the storage notification to the data storage system 103 via the communication interface 113 and while the first wireless data connection is established. At step 238, the data storage system may receive the storage notification. The storage notification may include one or more commands, that, when received by the data storage system 103, direct the data storage system 103 to store the storage notification. At step 239, based on or in response to the one or more commands directing the data storage system 103 to store the storage notification, the data storage system 103 may store the storage notification received at step 238. In some instances, the storage notification may be accessible by a plurality of user computing devices (such as a laptop computer, desktop computer, mobile device, tablet, smartphone, or the like) in a plurality of different geographic locations simultaneously.

At step 240, the automated error analysis and correction platform 102 may update the machine learning model. For example, the machine learning engine may be updated based on the outputs of steps 213, 215, 219, 226 and 233, and/or feedback received from the user device 104 and/or data storage system 103. In doing so, the automated error analysis and correction platform 102 may dynamically and continuously update and/or otherwise refine the machine learning engine so as to increase accuracy of the machine learning engine over time.

Figure 3:
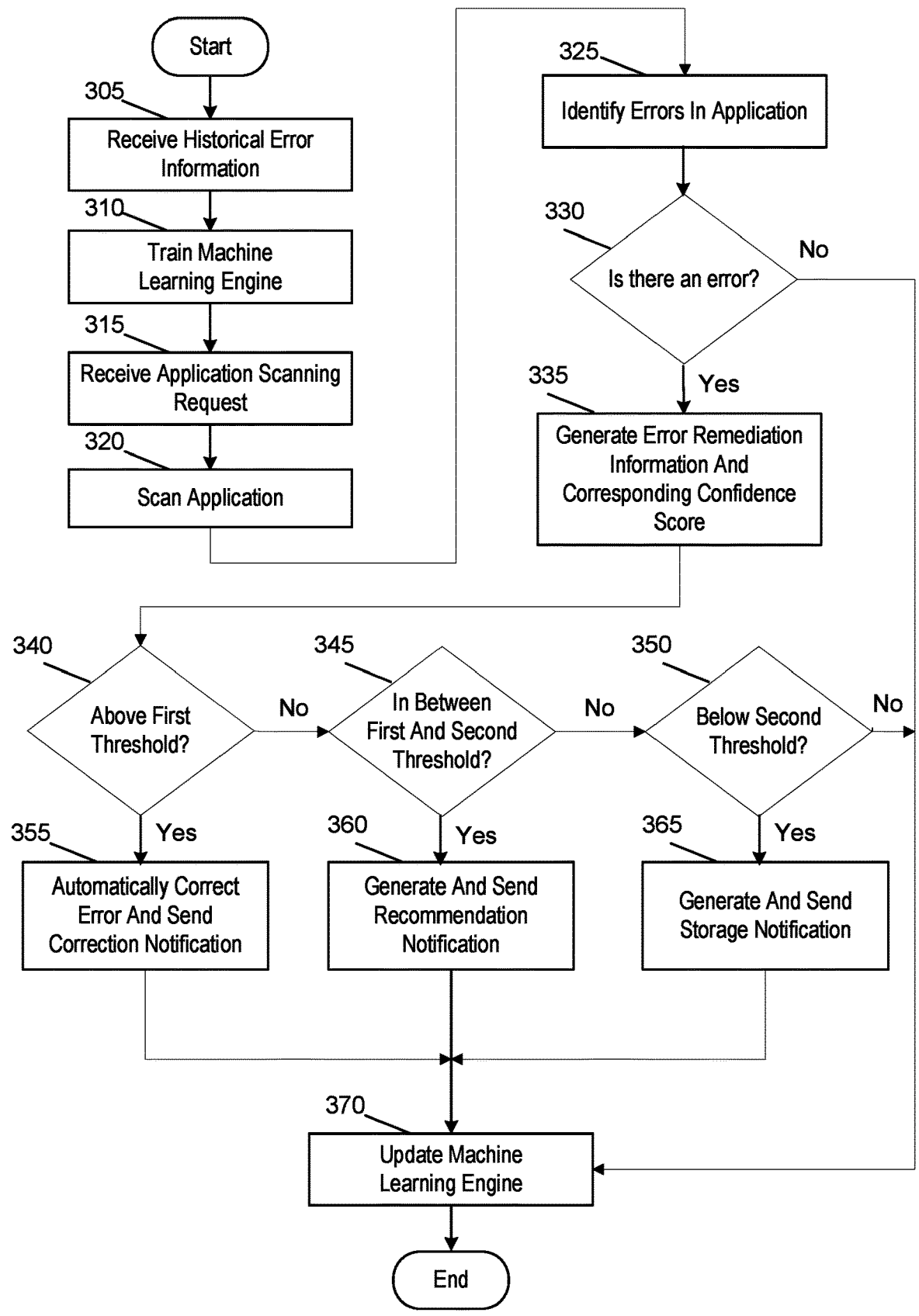
FIG. 3 depicts an illustrative method for implementing a development test automation framework to automatically detect, analyze, and correct errors in a given application in accordance with one or more example embodiments.

FIG. 3 depicts an illustrative method for implementing a development test automation framework to automatically detect, analyze, and correct errors in a given application in accordance with one or more example embodiments. At step 305, a computing platform having at least one processor, a communication interface, and memory may receive historical error information. At step 310, the computing platform may use the historical error information to train a machine learning engine. At step 315, the computing platform may receive a request to scan an application. At step 320, the computing platform may scan the application. At steps 325 and 330, the computing platform may identify and confirm the existence of errors in the application. If an error has not been identified, the computing platform may proceed to step 370. If an error has been identified, the computing platform may proceed to step 335. At step 335, the computing platform may generate error remediation information and a corresponding confidence score.

At step 340, the computing platform may determine whether the confidence score is above the first threshold. If the confidence score is above the first threshold, the computing platform may proceed to step 355. If the confidence score is not above the first threshold, the computing platform may proceed to step 345. At step 345, the computing platform may determine whether the confidence score is between the first threshold and the second threshold. If the confidence score is between the first threshold and the second threshold, the computing platform may proceed to step 360. If the confidence score is not between the first threshold and the second threshold, the computing platform may proceed to step 350. At step 350, the computing platform may determine whether the confidence score is below the second threshold. If the confidence score is below the second threshold, the computing platform may proceed to step 365. If the confidence score is not below the second threshold, the computing platform may proceed to step 370.

At step 355, the computing platform may automatically correct the error and send the correction notification. At step 360, the computing platform may generate a recommendation notification and send the recommendation notification. At step 365, the computing platform may generate a storage notification and send the storage notification. At step 370, the computing platform may update the machine learning engine.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:
1. A computing platform comprising:
one or more processors;
a communication interface communicatively coupled to the one or more processors; and
memory storing computer-readable instructions that, when executed by the one or more processors, cause the computing platform to:

train, based on historical error data, a machine learning engine, wherein training the machine learning engine configures the machine learning engine to identify, based on the historical error data, error remediation information comprising an action to correct an identified error and a confidence score corresponding to the action;

automatically generate a plurality of test cases using a plain language format;

execute the plurality of test cases to output a test result that identifies a first error in an application;

input the first error into the machine learning engine to output, for the first error, first error remediation information corresponding to the first error, wherein the first error remediation information comprises a first action to correct the first error;

automatically correct the first error using the first action; and send, once the first error has been corrected, one or more commands directing a data storage system to store an indication that the first error has been corrected, wherein sending the one or more commands directing the data storage system to store the indication that the first error has been corrected causes the data storage system to store the indication that the first error has been corrected.

2. The computing platform of claim 1, wherein the memory stores additional computer-readable instructions that, when executed by the one or more processors, cause the computing platform to:

receive, from a user device, a request to identify and correct errors in the application.

3. The computing platform of claim 1, wherein the memory stores additional computer-readable instructions that, when executed by the one or more processors, cause the computing platform to:

send a correction notification and one or more commands directing a user device to display the correction notification, wherein sending the one or more commands directing the user device to display the correction notification causes the user device to display the correction notification.

4. The computing platform of claim 1, wherein the first error remediation information further comprises a first confidence score corresponding to the first action.

5. The computing platform of claim 4, wherein the memory stores additional computer-readable instructions that, when executed by the one or more processors, cause the computing platform to:

compare the first confidence score to a first confidence threshold, wherein automatically correcting the first error using the first action is based on identifying that the first confidence threshold is exceeded.

6. The computing platform of claim 5, wherein the first confidence score indicates a confidence that the first action will successfully correct the first error.

7. The computing platform of claim 5, further comprising refining the machine learning engine based on:

the first error remediation information and the first confidence threshold; and whether the first action successfully corrected the first error at the first confidence threshold.

8. The computing platform of claim 5, wherein the memory stores additional computer-readable instructions that, when executed by the one or more processors, cause the computing platform to:

store, based on identifying that the first confidence threshold is not exceeded, the first error remediation information and the first confidence score at the data storage system.

9. The computing platform of claim 6, wherein the memory stores additional computer-readable instructions that, when executed by the one or more processors, cause the computing platform to:

identify a second error in the application based on the executing the plurality of the test cases;

input the second error into the machine learning engine to output, for the second error, second error remediation information corresponding to the second error, wherein the second error remediation information comprises a second action to correct the second error and a second confidence score corresponding to the second action; and compare the second confidence score to the first confidence threshold and a second confidence threshold that is lower than the first confidence threshold.

10. The computing platform of claim 9, wherein the memory stores additional computer-readable instructions that, when executed by the one or more processors, further cause the computing platform to:

based on determining that the second confidence score is lower than the first confidence threshold and higher than the second confidence threshold, generate a recommendation notification that:

recommends the second action to correct the second error; and indicates that the first error will not be automatically corrected based on the second confidence score.

11. The computing platform of claim 10, wherein the memory stores additional computer-readable instructions that, when executed by the one or more processors, further cause the computing platform to:

send the recommendation notification and one or more commands directing the data storage system to store the recommendation notification, wherein sending the one or more commands directing the data storage system to store the recommendation notification causes the data storage system to store the recommendation notification; and send the recommendation notification and one or more commands directing a user device to display the recommendation notification, wherein sending the one or more commands directing the user device to display the recommendation notification causes the user device to display the recommendation notification.

12. The computing platform of claim 9, wherein the memory stores additional computer-readable instructions that, when executed by the one or more processors, cause the computing platform to:

identify a third error in the application based on the executing the plurality of the test cases;

input the third error into the machine learning engine to output, for the third error, third error remediation information corresponding to the third error, wherein the third error remediation information comprises a third action to correct the third error and a third confidence score corresponding to the third action;

generate, based on determining that the third confidence score is lower than the first confidence threshold and lower than the second confidence threshold, a storage notification comprising the third error and the third action;

send the storage notification and one or more commands directing the data storage system to store the storage notification, wherein sending the one or more commands directing the data storage system to store the storage notification causes the data storage system to store the storage notification; and send the storage notification and one or more commands directing a user device to display the storage notification, wherein sending the one or more commands directing the user device to display the storage notification causes the user device to display the storage notification.

13. The computing platform of claim 1, wherein the plain language format is Gherkin language syntax.

14. The computing platform of claim 1, wherein the data storage system is simultaneously accessible by a plurality of different computing devices located in different geographic regions using login credentials associated with each of the plurality of different computing devices.

15. The computing platform of claim 1, wherein the data storage system is simultaneously accessible by a plurality of different computing devices located in different geographic regions using a variable token replacement scheme.

16. The computing platform of claim 1, wherein the application is stored locally at a user device.

17. The computing platform of claim 16, wherein the memory stores additional computer-readable instructions that, when executed by the one or more processors, cause the computing platform to:

send one or more commands directing the user device to identify at least one error in the application by executing the plurality of test cases, specific to the application, wherein the plurality of test cases are stored at the user device using the plain language format.

18. The computing platform of claim 17, further comprising sending one or more commands directing the user device to transfer the application from the user device to the computing platform.

19. A method comprising:

at a computing platform comprising at least one processor, a communication interface, and memory:

training, based on historical error data, a machine learning engine, wherein training the machine learning engine configures the machine learning engine to identify, based on the historical error data, error remediation information comprising an action to correct an identified error and a confidence score corresponding to the action;

automatically generating a plurality of test cases using a plain language format;

executing the plurality of test cases to output a test result that identifies a first error in an application;

inputting the first error into the machine learning engine to output, for the first error, first error remediation information corresponding to the first error, wherein the first error remediation information comprises a first action to correct the first error;

automatically correcting the first error using the first action; and sending, once the first error has been corrected, one or more commands directing a data storage system to store an indication that the first error has been corrected, wherein sending the one or more commands directing the data storage system to store the indication that the first error has been corrected causes the data storage system to store the indication that the first error has been corrected.

20. One or more non-transitory computer-readable media storing instructions that, when executed by a computing platform comprising at least one processor, a communication interface, and memory, cause the computing platform to:

train, based on historical error data, a machine learning engine, wherein training the machine learning engine configures the machine learning engine to identify, based on the historical error data, error remediation information comprising an action to correct an identified error and a confidence score corresponding to the action;

automatically generate a plurality of test cases using a plain language format;

execute the plurality of test cases to output a test result that identifies a first error in an application;

input the first error into the machine learning engine to output, for the first error, first error remediation information corresponding to the first error, wherein the first error remediation information comprises a first action to correct the first error;

automatically correct the first error using the first action; and send, once the first error has been corrected, one or more commands directing a data storage system to store an indication that the first error has been corrected, wherein sending the one or more commands directing the data storage system to store the indication that the first error has been corrected causes the data storage system to store the indication that the first error has been corrected.

* * * * *